US009557075B2

(12) United States Patent
Ryu

(10) Patent No.: US 9,557,075 B2
(45) Date of Patent: Jan. 31, 2017

(54) CONDENSING HEAT EXCHANGER AND BOILER/WATER HEATER INCLUDING THE SAME

(71) Applicant: Daesung Industrial Co. Ltd., Seoul (KR)

(72) Inventor: Hyun Wook Ryu, Cheongwon-gun (KR)

(73) Assignee: Daesung Industrial Co. Ltd., Seoul (KR)

( * ) Notice: Subject to any disclaimer, the term of this patent is extended or adjusted under 35 U.S.C. 154(b) by 70 days.

(21) Appl. No.: 14/394,676

(22) PCT Filed: Apr. 2, 2013

(86) PCT No.: PCT/KR2013/002738
§ 371 (c)(1),
(2) Date: Oct. 15, 2014

(87) PCT Pub. No.: WO2013/172547
PCT Pub. Date: Nov. 21, 2013

(65) Prior Publication Data
US 2015/0090201 A1    Apr. 2, 2015

(30) Foreign Application Priority Data

May 15, 2012  (KR) .................. 10-2012-0051471

(51) Int. Cl.
*F24H 8/00* (2006.01)
*F24H 1/28* (2006.01)
(Continued)

(52) U.S. Cl.
CPC ............. *F24H 1/287* (2013.01); *F22B 9/02* (2013.01); *F22B 9/06* (2013.01); *F22B 29/06* (2013.01);
(Continued)

(58) Field of Classification Search
CPC ....... Y02B 30/102; Y02B 30/106; F24H 8/00; F24H 8/006; F24H 1/445; F28D 1/0475
(Continued)

(56) References Cited

U.S. PATENT DOCUMENTS 462,975 A * 11/1891 Fowler ................... F22B 25/00
122/271
5,228,413 A * 7/1993 Tam ......................... F24H 1/48
122/15.1
(Continued)

FOREIGN PATENT DOCUMENTS

KR    20-1994-0002811 Y1    4/1994
KR    10-2005-0033991 A     4/2005
(Continued)

OTHER PUBLICATIONS

International Search Report and Written Opinion mail date Jun. 27, 2013 for International Patent Application No. PCT/KR2013/002738 filed on Apr. 2, 2013 by Daesung Industrial Co. Ltd., 8 pages.

*Primary Examiner* — Gregory A Wilson
(74) *Attorney, Agent, or Firm* — Cesari and McKenna, LLP

(57) ABSTRACT

The present invention relates to a condensing heat exchanger and a boiler/water heater including the same and, more particularly, to a condensing heat exchanger, which can increase a contact area between water and a combustion gas having high temperature and improve efficiency by passing a combustion gas, generated from a combustion chamber, through a plurality of exhaust pipes and which can be fabricated in a small and compact size, and a boiler/water heater including the same.

8 Claims, 4 Drawing Sheets

(51) Int. Cl.
  *F22B 9/02*  (2006.01)
  *F22B 9/06*  (2006.01)
  *F22B 29/06*  (2006.01)

(52) U.S. Cl.
  CPC *F24H 1/28* (2013.01); *F24H 8/00* (2013.01); *Y02B 30/102* (2013.01)

(58) Field of Classification Search
  USPC .............. 122/15.1, 18.1, 44.1, 55, 64, 87
  See application file for complete search history.

(56) References Cited

U.S. PATENT DOCUMENTS

| | | | | |
|---|---|---|---|---|
| 5,666,943 | A * | 9/1997 | Adams | F24H 1/206 |
| | | | | 122/18.3 |
| 7,258,080 | B2 * | 8/2007 | Missoum | F24H 1/205 |
| | | | | 122/18.1 |
| 7,290,503 | B2 * | 11/2007 | Missoum | F24H 1/206 |
| | | | | 122/121 |
| 7,900,589 | B2 * | 3/2011 | Gordon | F24H 1/205 |
| | | | | 122/155.1 |
| 8,813,688 | B2 * | 8/2014 | Pacholski | F24H 1/287 |
| | | | | 122/15.1 |
| 2009/0308568 | A1 * | 12/2009 | Min | F24H 9/0036 |
| | | | | 165/47 |
| 2010/0018475 | A1 * | 1/2010 | Arnold | F24H 1/206 |
| | | | | 122/18.1 |

FOREIGN PATENT DOCUMENTS

| | | |
|---|---|---|
| KR | 10-2007-0078622 A | 8/2007 |
| KR | 10-2009-0063438 A | 6/2009 |

* cited by examiner

CONDENSING HEAT EXCHANGER AND BOILER/WATER HEATER INCLUDING THE SAME

CROSS-REFERENCE TO RELATED APPLICATIONS

This application is the National Stage of International Application No. PCT/KR2013/002738, filed on Apr. 2, 2013, which claims the benefit of Korean Application No. 10-2012-0051471, filed on May 15, 2012. The contents of both applications are hereby incorporated by reference in their entirety.

TECHNICAL FIELD

The present invention relates to a condensing heat exchanger and a boiler/water heater including the same and, more particularly, to a condensing heat exchanger, which can increase a contact area between water and a combustion gas having high temperature and improve efficiency by passing a combustion gas, generated from a combustion chamber, through a plurality of exhaust pipes and which can be fabricated in a small and compact size, and a boiler/water heater including the same.

BACKGROUND ART

As energy is recently increasingly used worldwide, supplementary problems, such as environmental pollution, are frequently generated. In order to solve the problems, eco-friendly alternative energy is being developed worldwide.

Since to change chemical energy now being used all at once is difficult, much research is being carried out in order to improve efficiency of devices that use energy as one option for solving problems, such as environmental pollution and research for economic effects resulting from reduced maintenance costs is also being carried out.

As part of the research, various types of high-efficiency heat exchangers are being proposed in order to improve the heat transfer efficiency of gas devices, such as a boiler for heating and a water heater.

In order to improve the heat exchanger efficiency, a method of increasing a heat transfer area by adding a plurality of heat exchange roots is chiefly used. In this case, there is a problem in that the volume of a heat exchanger is increased. Furthermore, there is a problem in that a loss of water pressure is increased because a channel between a water inlet port and a water outlet port is increased due to the added heat exchange roots.

Furthermore, in a low-efficiency heat exchanger, there is no problem in the generation of condensate water, but in a high-efficiency heat exchanger, there is a problem in that condensate water is generated and the generated condensate water deteriorates heat exchange efficiency.

In particular, a conventional one path condensing heat exchanger is problematic in that volume is increased on the basis of a direction where water flows. Furthermore, a conventional two-path condensing heat exchanger is problematic in that a manufacturing process is complicated because a fluid passage has to be formed by plural times of welding processing and the lifespan of the condensing heat exchanger is reduced due to corrosion.

DISCLOSURE OF INVENTION

Technical Problem

Accordingly, the present invention has been made in view of the above problems, and it is a first object of the present invention to provide a condensing heat exchanger, which can increase a contact area between water and a combustion gas having high temperature and improve efficiency by passing a combustion gas, generated from a combustion chamber, through a plurality of exhaust pipes and which can be fabricated in a small and compact size, and a boiler/water heater including the same.

A second object of the present invention is to provide a condensing heat exchanger having a two-path structure, a simple welding process, high production efficiency, and a longer lifespan, and a boiler/water heater including the same.

Solution to Problem

In accordance with an aspect of the present invention, a condensing heat exchanger, including a body configured to have a hollow and airtight barrel shape, a combustion chamber provided within the body and configured to have a plurality of through holes for discharging a combustion gas G formed in a top surface of the combustion chamber, exhaust pipes configured to have first ends combined with the respective through holes of the combustion chamber and have second ends combined with the body, a water inlet port provided on a first side of the body and configured to have water W introduced through the water inlet port, and a water outlet port provided on a second side of the body and configured to discharge the water W heated within the body and a boiler/water heater including the same.

Here, the combustion chamber further includes a main body configured to have the plurality of through holes formed in the main body, a burner provided within the main body, and a ventilator directed toward the burner.

The condensing heat exchanger further includes a first fixing member provided on one side of the plurality of exhaust pipes and configured to position the plurality of exhaust pipes and improve a heat transfer area.

Furthermore, the first fixing member is formed of a ring-shaped flat panel member so that the combustion chamber is inserted into a central part of the first fixing member, a plurality of first through holes through which the respective exhaust pipes can pass is formed on one side of the first fixing member, an outer circumferential face of the first fixing member is closely adhered to the body so that a flow of the water is changed in order to increase a time that the water stays within the body, and an inner circumferential face of the first fixing member is spaced apart from the combustion chamber.

Furthermore, the plurality of through holes is formed in the top surface of the combustion chamber, each of the exhaust pipes is formed in a ∩-shaped form, and ends of the exhaust pipes on both sides thereof are connected to the respective through holes of the combustion chamber and an edge part of a lower part of the body.

The condensing heat exchanger further includes a second fixing member provided at an upper part of the exhaust pipes and configured to position the plurality of exhaust pipes and have a disk shape in order to improve a heat transfer area. The second fixing member includes a plurality of second through holes formed in a central area of the second fixing member and configured to have the plurality of exhaust pipes, connected to the combustion chamber, pass through the respective second through holes and a plurality of sawteeth formed in the outer circumferential face of the second fixing member and configured to position the plurality of exhaust pipes.

Furthermore, the plurality of through holes is formed on one side of the upper part of the side wall surface of the combustion chamber, and the plurality of through holes formed in the side wall surface of the combustion chamber and the edge part of the lower part of the body are connected to the ends of the exhaust pipes on both sides thereof.

Furthermore, the exhaust pipe has an oval cross section in order to improve heat transfer efficiency by improving a heat transfer area.

Furthermore, the exhaust pipes are radially arranged to a plane direction.

In accordance with another aspect of the present invention, a condensing heat exchanger includes a body configured to have a hollow and airtight barrel shape, a combustion chamber provided within the body and configured to have a plurality of through holes for discharging a combustion gas formed in a top surface of the combustion chamber, a burner provided within the combustion chamber, a ventilator disposed at the bottom of the burner and configured to supply air, a plurality of exhaust pipes configured to have first ends combined with the respective through holes, central areas curved in a ∩-shaped form, and second ends combined with a bottom of the body and radially arranged to a plane direction, a water inlet port provided on one side of a lower part of the body and configured to have water introduced through the water inlet port, a water outlet port provided on one side of a top of the body and configured to discharge the water heated within the body, and at least one fixing member configured to position the plurality of exhaust pipes.

In accordance with yet another aspect of the present invention, a condensing heat exchanger includes a body configured to have a hollow and airtight barrel shape, a combustion chamber provided within the body and configured to have a plurality of through holes for discharging a combustion gas formed in a top surface of the combustion chamber, a burner provided within the combustion chamber, a ventilator disposed at the bottom of the burner and configured to supply air, a plurality of exhaust pipes configured to have first ends combined with the respective through holes, central areas curved in a ¬-shaped form, and second ends combined with a bottom of the body and radially arranged to a plane direction, a water inlet port provided on one side of a lower part of the body and configured to have water introduced through the water inlet port, a water outlet port provided on one side of a top of the body and configured to discharge the water heated within the body, and at least one fixing member configured to position the plurality of exhaust pipes.

Advantageous Effects of Invention

In accordance with the present invention, there are advantages in that heat exchange efficiency of the heat exchanger can be increased because a high-temperature combustion gas generated from the combustion chamber is discharged through the plurality of exhaust pipes and a two-path method is adopted and the high-efficiency tubular heat exchanger can be fabricated without an additional increase of volume.

Furthermore, there is an advantage in that a loss of water pressure is reduced because a path between the inlet port and the outlet port is short.

Furthermore, there is an advantage in that a reduction in the efficiency of the heat exchanger can be minimized because a direction where condensate water drops is made parallel to a direction where a combustion gas travels although the condensate water is generated from the exhaust pipes.

Furthermore, there are advantages in that water can smoothly flow by positioning the plurality of exhaust pipes by using the first fixing member and the second fixing member and heat exchange efficiency of a heat exchanger can be further improved by increasing a heat exchange area by the first fixing member and the second fixing member.

BRIEF DESCRIPTION OF DRAWINGS

The following drawings attached to this specification illustrate exemplary embodiments of the present invention and function to further facilitate understanding of the technical spirit of the present invention along with the detailed description of the present invention. Accordingly, the present invention should not be construed as being limited to only the drawings.

DESCRIPTION OF REFERENCE NUMERALS OF PRINCIPAL ELEMENTS IN THE DRAWINGS

Figure 1:
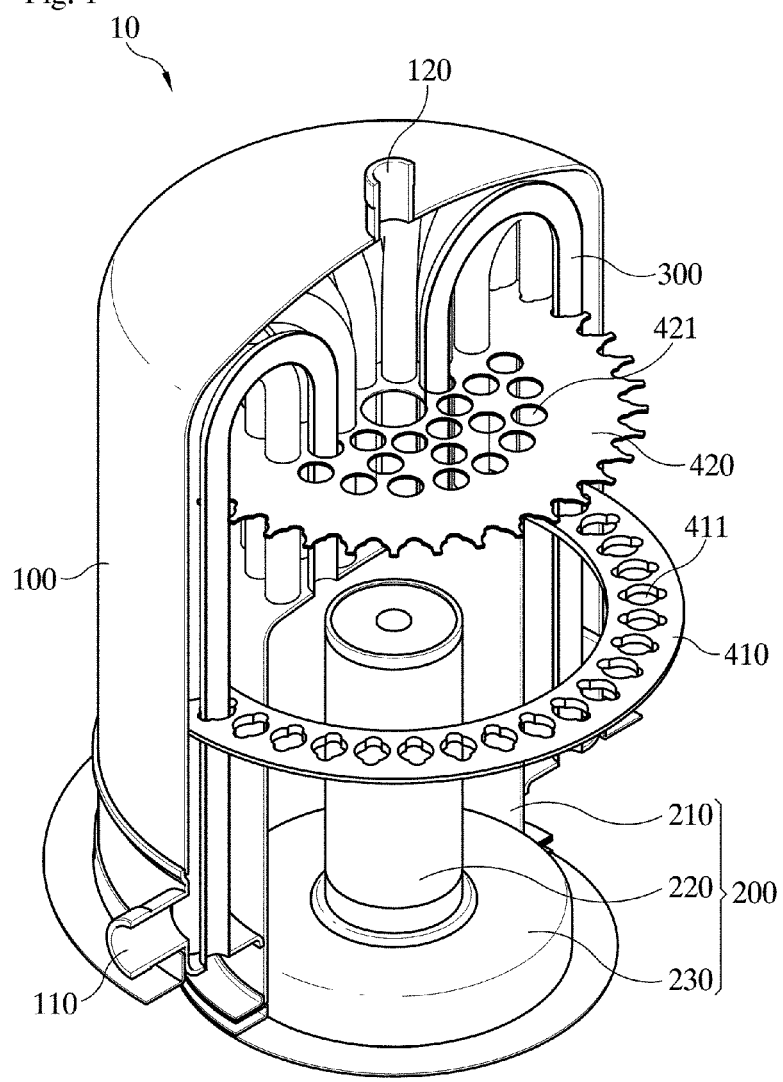
FIG. 1 is a partially cut-away perspective view of a condensing heat exchanger in accordance with a first embodiment of the present invention.

10: heat exchanger 100: body
110: water inlet port 120: water outlet port
200: combustion chamber 210: main body
211: through hole 220: burner
230: ventilator 300: exhaust pipe
410: first fixing member W: water
411: first pipe through hole
420: second fixing member G: combustion gas
421: second pipe through hole Best Mode for Carrying Out the Invention Some exemplary embodiments of the present invention will be described in detail below with reference to the accompanying drawings.

(First Embodiment)

Figure 2:
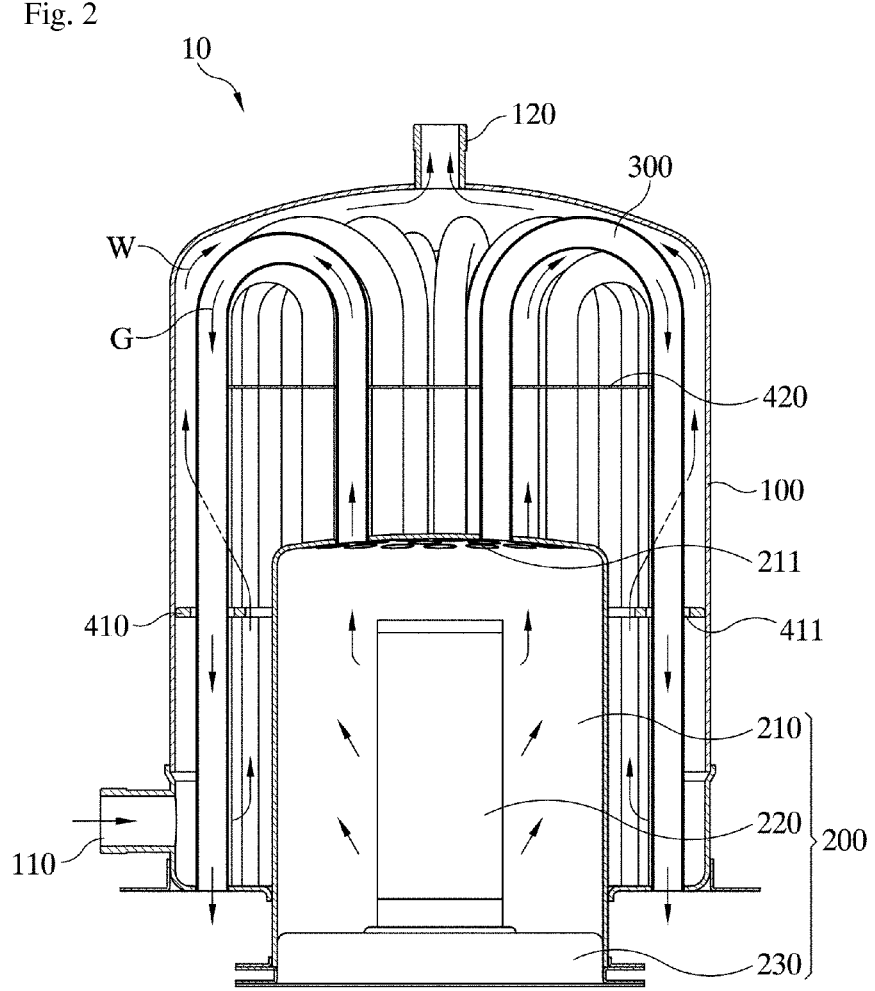
FIG. 2 is a longitudinal cross-sectional view of the condensing heat exchanger in accordance with the first embodiment of the present invention.

FIG. 1 is a partially cut-away perspective view of a condensing heat exchanger in accordance with a first embodiment of the present invention, and FIG. 2 is a longitudinal cross-sectional view of the condensing heat exchanger in accordance with the first embodiment of the present invention. As shown in FIGS. 1 and 2, the condensing heat exchanger 10 in accordance with the first embodiment of the present invention basically includes a body 100, a combustion chamber 200, exhaust pipes 300, a water inlet port 110, and a water outlet port 120.

The body 100 includes the combustion chamber 200 and the exhaust pipes 300 for heating water W and provides a space capable of storing the water W. The body 100 is formed of a hollow and airtight barrel-shaped member.

The combustion chamber 200 is provided at the center of the bottom of the body 100 on one side of the body 100 and configured to generate a combustion gas G for heating the water W. The combustion chamber 200 is equipped with a main body 210, a burner 220, and a ventilator 230.

The main body 210 is configured to be hollow in order to provide a space in which the burner 220 and the ventilator 230 can be seated. A plurality of through holes 211 for discharging the combustion gas G generated from the burner 220 is formed on one side of the main body 210. Here, the plurality of through holes 211 is formed in a wall surface of the top surface of the main body 210 on one side of the main body 210. The number of through holes 211 is about 20 to 50. The size of each of the through holes 211, the number of through holes 211, and a location where the through hole 211 can be determined depending on a capacity and use environment of the heat exchanger 10. If the number of through holes 211 is less than 20, heating efficiency is low because the combustion gas G is not easily discharged and thus the time taken to heat the water W becomes long. If the number of through holes 211 exceeds 50, the unit cost of production is increased and a manufacture time can become long because the number of exhaust pipes 300 connected to the through holes 211 is increased.

The burner 220 is provided at the center of the bottom of the main body 210 on one side of the main body 210 within the main body 210 and is configured to mix fuel, such as a gas, and air and generate the combustion gas G having high temperature by igniting and combusting the mixture.

The ventilator 230 is provided at the bottom of the burner 220 on one side of the burner 220 and is configured to ventilate the combustion gas G generated from the burner 220 so that the combustion gas G is easily diffused upwardly from the main body 210.

The exhaust pipes 300 provide passages through which the combustion gas G generated from the combustion chamber 200 passes within the body 100 and the water W can be heated. Each of the exhaust pipes 300 is formed in a ∩-shaped form in order to heat the water W in accordance with a two-path method and is configured to have ends thereof on both sides connected to the through holes 211 of the combustion chamber 200 and the edge part of the lower part of the body 100. Here, the plurality of exhaust pipes 300 is radially arranged to a plane direction. Furthermore, the exhaust pipe 300 can be fabricated to have an oval cross section in order to increase a contact area with the water W, and the exhaust pipe 300 can be fabricated to have a generally oval shape or a partial cross section. The exhaust pipe 300 is made of stainless steel in order to prevent the exhaust pipe 300 from being corroded by condensate water generated when the combustion gas G is condensed and by taking welding with the body 100 and the combustion chamber 200 into consideration. Furthermore, in order to provide a wider heat transfer area, a plurality of pins may be provided on the outer surface of the exhaust pipe 300.

The water inlet port 110 is provided on the side of the body 100 and is connected to a cold water pipe, that is, a water supply pipe, so that cold water for heating can be supplied to the water inlet port 110. The water inlet port 110 may be provided at any place of the body 100, but preferably is provided on one side of the lower part of the side wall surface of the body 100.

The water outlet port 120 is configured to come in contact with the outer circumferential face of the combustion chamber 200 and the outer circumferential faces of the exhaust pipes 300 within the body 100 and to discharge the combustion gas G having high temperature and the water W heated by way of heat exchange. Like the water inlet port 110, the water outlet port 120 can be provided at any place of the body 100, but preferably is provided on at the top of the body 100 on one side of the body 100 or at a central area of the body 100.

A first fixing member 410 and a second fixing member 420 are provided on one side of the exhaust pipes 300 and configured to position the plurality of exhaust pipes 300. The first fixing member 410 and the second fixing member 420 functions to improve the contact area of the water W, increase the time that the water W stays within the body 100 by changing the fluid path of the water W, and improve heat transfer efficiency of the water W.

The first fixing member 410 is formed of a generally ring-shaped flat panel member. A plurality of first through holes 411 corresponding to the number of exhaust pipes 300 so that the exhaust pipes 300 can pass through the first through holes 411 is formed on one side of the first fixing member 410. The combustion chamber 200 is located at the center of the first fixing member 410, and the pillar parts of the exhaust pipes 300 combined with the edge part of the lower part of the body 100 penetrate the first through holes 411 so that the exhaust pipes 300 are positioned. Here, the outer circumferential face of the first fixing member 410 is closely adhered to the inner surface of the body 100 in order to change a flow of the water W, and the inner circumferential face of the first fixing member 410 is spaced apart from the outer circumferential face of the combustion chamber 200 at a specific interval. That is, the water W introduced through the lower part of the body 100 flows only through a space between the outer wall of the combustion chamber 200 and the first fixing member 410 while rising, and thus a flow of the water W is changed. As a result, the time that the water W stays within the body 100 is increased.

Furthermore, as shown in FIG. 1, a space spaced apart from each of the exhaust pipes 300 is also formed on one side of each of the first through holes 411, so the water W can also flow through the space between the first through hole 411 and the exhaust pipe 300. Furthermore, since the first fixing member 410 comes in contact with the plurality of exhaust pipes 300, temperature of the exhaust pipes 300 is transferred to the first fixing member 410, and the transferred temperature is transferred to the water W. As a result, heat transfer efficiency can be improved because a contact area between the water W and the first fixing member 410 having high temperature is increased. Like the exhaust pipes 300, the first fixing member 410 is made of stainless steel having excellent heat transfer efficiency and an anti-corrosive characteristic against the water W.

The second fixing member 420 is provided at the upper part of the exhaust pipes 300 on one side thereof, preferably, at parts curved in a ∩-shaped form on one side of the exhaust pipes 300 between the two pillar parts. Like the first fixing member 410, the second fixing member 420 functions to improve the contact area of the water W, increase the time that the water W stays within the body 100 by changing a flow of the water W, and improve heat transfer efficiency of the water W. The second fixing member 420 is formed of a generally disk-shaped sheet member. A plurality of second through holes 421 is formed in the central part of the second fixing member 420 on one side of the second fixing member 420 and is configured to have the pillar parts of the exhaust pipes 300, connected to the combustion chamber 200, pass therethrough. A plurality of sawteeth for positioning the pillar parts of the exhaust pipes 300 connected to the edge part of the upper part of the body 100 is formed in the outer circumferential face of the second fixing member 420.

The second through holes 421 are closely adhered to the exhaust pipes 300 without a gap therebetween. Owing to the second fixing member 420, the water W does not flow between the pillar parts of the exhaust pipes 300, but the water W flows between the exhaust pipes 300 and the body 100. Accordingly, the time that the water W stays within the body 100 is increased because a flow of the water W is changed again. Furthermore, temperature of the exhaust pipes 300 is transferred to the second fixing member 420 because the second fixing member 420 comes in contact with the plurality of exhaust pipes 300, and the transferred temperature is transferred to the water W. As a result, heat transfer efficiency is improved because a contact area between the water W and the second fixing member 420 having high temperature is increased. Like the exhaust pipes 300, the second fixing member 420 is made of stainless steel having excellent heat transfer efficiency and an anti-corrosive characteristic against the water W.

A plurality of heat transfer pins can be further formed in surfaces of the first and the second fixing members 410 and 420.

Mode for the Invention (Second Embodiment)

Figure 3:
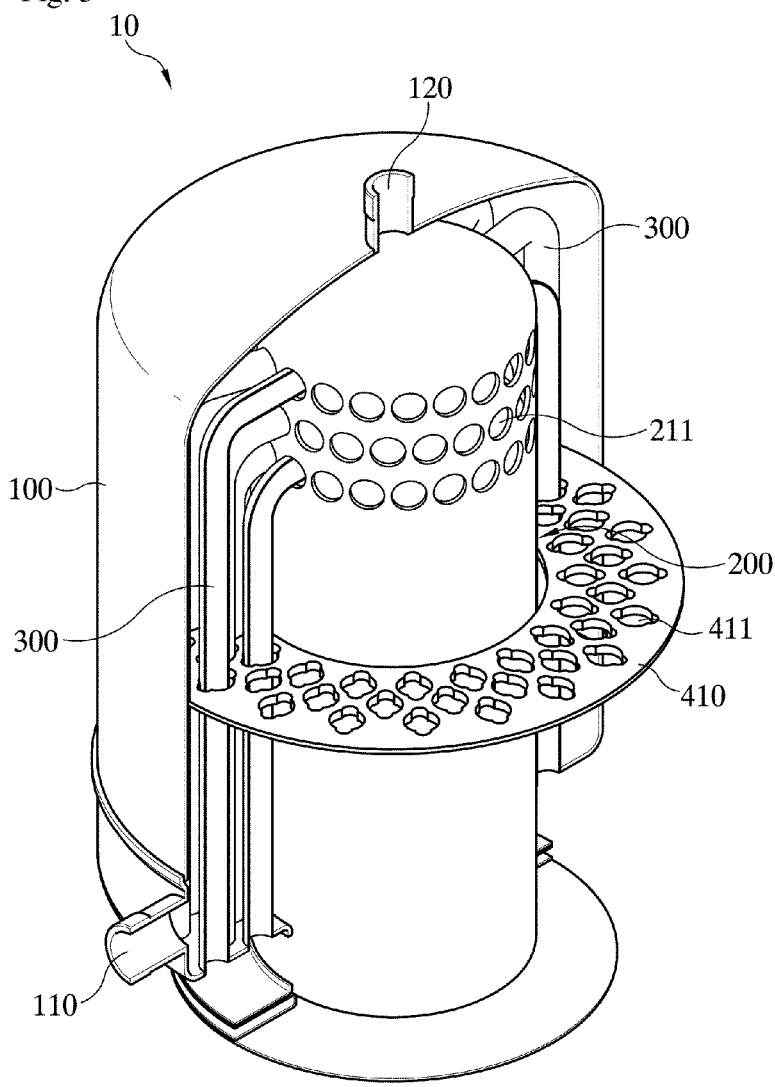
FIG. 3 is a partially cut-away perspective view of a condensing heat exchanger in accordance with a second embodiment of the present invention.
Figure 4:
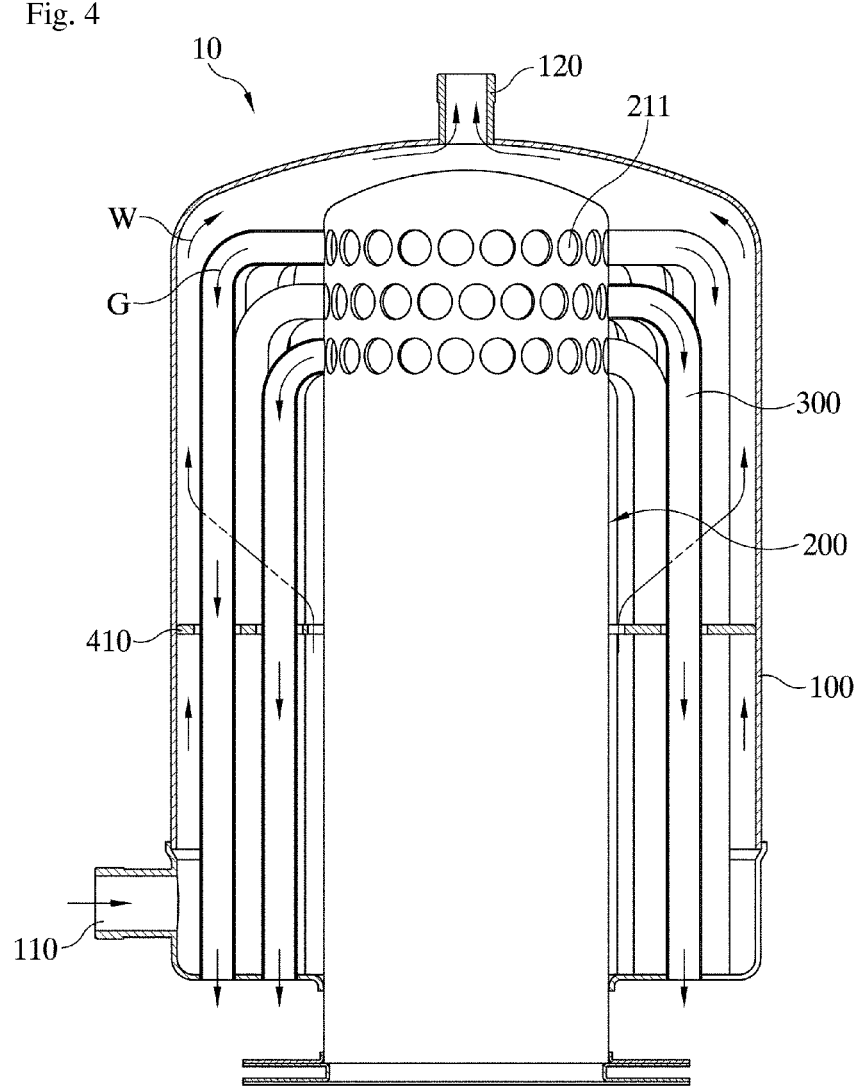
FIG. 4 is a longitudinal cross-sectional view of the condensing heat exchanger in accordance with the second embodiment of the present invention.

FIG. 3 is a partially cut-away perspective view of a condensing heat exchanger in accordance with a second embodiment of the present invention, and FIG. 4 is a longitudinal cross-sectional view of the condensing heat exchanger in accordance with the second embodiment of the present invention. The condensing heat exchanger 10 in accordance with the second embodiment of the present invention has a similar construction as that of the first embodiment. As shown in FIGS. 3 and 4, the condensing heat exchanger 10 in accordance with the second embodiment basically includes a body 100, a combustion chamber 200, exhaust pipes 300, a water inlet port 110, a water outlet port 120, and a first fixing member 410.

The body 100, the water inlet port 110, the water outlet port 120, and the first fixing member 410 are the same as those of the first embodiment, and thus a detailed description thereof is omitted. The combustion chamber 200 and the exhaust pipes 300 different from those of the first embodiment are chiefly described below.

The combustion chamber 200 has a similar construction as that of the first embodiment, but differs from that of the first embodiment in that the length of the main body 210 of the combustion chamber 200 almost approaches the top of the body 100 and through holes 211 through which a combustion gas G is discharged are concentrated on and formed at the upper part of the side wall surface of the combustion chamber 200.

An object and material of the exhaust pipes 300 are the same as those of the first embodiment. In the second embodiment, the exhaust pipe 300 is not form in a ∩-shaped form according to a configuration of the combustion chamber 200 as in the first embodiment, but is formed in a ⌐-shaped form so that ends on both sides of the exhaust pipe 300 is connected to the through hole 211 formed in the side wall surface of the combustion chamber 200 and the edge part of the lower part of the body 100. Accordingly, in the second embodiment, the second fixing member 420 of the first embodiment is not included because the ∩-shaped part is not present.

As a modified example of the present invention, in the second embodiment, the first fixing member 410 and the exhaust pipes 300 may be spaced apart from each other and may be closely adhered together or fixed. In the first embodiment, the second fixing member 420 and the exhaust pipes 300 may be spaced apart from each other and may be closely adhered together or fixed. Furthermore, a center hole through which the exhaust pipes do not pass may be further formed at the center of the second fixing member 420 in order to change part of a path through which the water flows.

If the heat exchanger in accordance with the first embodiment or the second embodiment is installed in a boiler/water heater, the a boiler/water heater can have the same construction and operation of a condensing a boiler/water heater.

As described above, those skilled in the art to which the present invention pertains will understand that the present invention may be implemented in other various forms without departing from the technical spirit or essential characteristics of the present invention. Accordingly, the aforementioned embodiments should be construed as being only illustrative not being limitative from all aspects. Furthermore, the scope of the present invention is defined by the appended claims rather than the detailed description. It should be understood that all modifications or variations derived from the meanings and range of the present invention and equivalents thereof are included in the scope of the appended claims.

The invention claimed is:

1. A condensing heat exchanger, comprising:
   a body 100 configured to have a hollow and airtight barrel shape; a combustion chamber 200 provided within the body 100 and configured to have a plurality of through holes 211 for discharging a combustion gas G formed in a top surface of the combustion chamber 200;
   exhaust pipes 300 configured to have first ends combined with the respective through holes 211 of the combustion chamber 200 and have second ends combined with the body 100;
   a water inlet port 110 provided on a first side of the body 100 and configured to have water W introduced through the water inlet port 110;
   a water outlet port 120 provided on a second side of the body 100 and configured to discharge the water W heated within the body 100;
   wherein the plurality of through holes 211 is formed in the top surface of the combustion chamber 200,
   the exhaust pipes 300 is formed in a ∩-shaped form, and ends of the exhaust pipes 300 on both sides thereof are connected to the respective through holes 211 of the combustion chamber 200 and an edge part of a lower part of the body 100, and
   a second fixing member 420 provided at an upper part of the exhaust pipes 300 and configured to position the plurality of exhaust pipes 300 and have a disk shape in order to improve a heat transfer area, a plurality of second through holes 421 formed in a central area of the second fixing member 420 and configured to have the plurality of exhaust pipes 300, connected to the combustion chamber 200, pass through the respective second through holes 421 and a plurality of sawteeth formed in an outer circumferential face of the second fixing member 420 and configured to position the plurality of exhaust pipes 300.

2. The condensing heat exchanger of claim 1, wherein the combustion chamber 200 further comprises:
   a main body 210 configured to have the plurality of through holes 211 formed in the main body 210;

a burner 220 provided within the main body 210; and a ventilator 230 directed toward the burner 220.

3. The condensing heat exchanger of claim 1, further comprising a first fixing member 410 provided on one side of the plurality of exhaust pipes 300 and configured to position the plurality of exhaust pipes 300 and improve a heat transfer area.

4. The condensing heat exchanger of claim 3, wherein:
the first fixing member 410 is formed of a ring-shaped flat panel member so that the combustion chamber 200 is inserted into a central part of the first fixing member 410,
a plurality of first through holes 411 through which the respective exhaust pipes 300 can pass is formed on one side of the first fixing member 410, and wherein
an outer circumferential face of the first fixing member 410 is closely adhered to the body 100 so that a flow of the water W is changed in order to increase a time that the water W stays within the body 100, and an inner circumferential face of the first fixing member 410 is spaced apart from the combustion chamber 200.

5. The condensing heat exchanger of claim 1, wherein:
the plurality of through holes 211 is formed on one side of an upper part of a side wall surface of the combustion chamber 200, and
the plurality of through holes 211 formed in the side wall surface of the combustion chamber 200 and an edge part of a lower part of the body 100 are connected to ends of the exhaust pipes 300 on both sides thereof.

6. The condensing heat exchanger of claim 1, wherein the exhaust pipe 300 has an oval cross section in order to improve heat transfer efficiency by improving a heat transfer area.

7. The condensing heat exchanger of claim 1, wherein the exhaust pipes 300 are radially arranged to a plane direction.

8. A condensing heat exchanger, comprising:
a body 100 configured to have a hollow and airtight barrel shape;
a combustion chamber 200 provided within the body 100 and configured to have a plurality of through holes 211 for discharging a combustion gas G formed in a top surface of the combustion chamber 200;
a burner 220 provided within the combustion chamber 200;
a ventilator 230 disposed at a bottom of the burner 220 and configured to supply air;
a plurality of exhaust pipes 300 configured to have first ends combined with the respective through holes 211, central areas curved in a ¬-shaped form, and second ends combined with a bottom of the body 100 and radially arranged to a plane direction;
a water inlet port 110 provided on one side of a lower part of the body 100 and configured to have water W introduced through the water inlet port 110;
a water outlet port 120 provided on one side of a top of the body 100 and configured to discharge the water W heated within the body 100; and
at least one fixing member configured to position the plurality of exhaust pipes 300.

\* \* \* \* \*

UNITED STATES PATENT AND TRADEMARK OFFICE
CERTIFICATE OF CORRECTION

| | | |
|---|---|---|
| PATENT NO. | : 9,557,075 B2 | Page 1 of 1 |
| APPLICATION NO. | : 14/394676 | |
| DATED | : January 31, 2017 | |
| INVENTOR(S) | : Hyun Wook Ryu | |

It is certified that error appears in the above-identified patent and that said Letters Patent is hereby corrected as shown below:

On the Title Page

First Column, Assignee's name should read as follows:
-- (73) Assignee:    Daesung Celtic Enersys Co., Ltd., Seoul, (KR) --

In the Specification

Column 8, Line 13 should read as follows:
-- heater, the boiler/water heater can have the same construct- --

Signed and Sealed this
Fifth Day of September, 2017

Joseph Matal
*Performing the Functions and Duties of the*
*Under Secretary of Commerce for Intellectual Property and*
*Director of the United States Patent and Trademark Office*